United States Patent [19]
Javidi et al.

[11] Patent Number: 5,119,443
[45] Date of Patent: Jun. 2, 1992

[54] NONLINEAR JOINT TRANSFORM OPTICAL CORRELATOR HAVING VARYING DEGREES OF NONLINEARITY

[76] Inventors: Bahram Javidi, 60 Burt Latham Rd., Barbara Manor, F-16, Willington, Conn.; Joseph L. Horner, 38 Oakley Rd., Belmont, Mass. 02178

[21] Appl. No.: 541,113

[22] Filed: Jun. 14, 1990

[51] Int. Cl.[5] .............................................. G06K 9/64
[52] U.S. Cl. .................................. 382/42; 364/822; 359/561
[58] Field of Search .................. 382/42, 43, 31; 364/822, 827, 819, 725, 728.03; 350/162.13, 162.12, 162.14; 365/125

[56] References Cited

U.S. PATENT DOCUMENTS

| | | | |
|---|---|---|---|
| 4,357,676 | 11/1982 | Brown | 364/822 |
| 4,539,651 | 9/1985 | Ludman | 364/822 |
| 4,695,973 | 9/1987 | Yu | 364/822 |
| 4,765,714 | 8/1988 | Horner et al. | 364/822 |
| 4,832,447 | 5/1989 | Javidi | 364/822 |

*Primary Examiner*—Joseph Mancuso
*Attorney, Agent, or Firm*—Robert L. Nathans; Donald J. Singer

[57] ABSTRACT

In a nonlinear joint transform image correlator, the Fourier transform interference intensity is nonlinearly transformed to provide higher correlation peak intensity and a better defined correlation spot. The correlation signals are determined, for example, in terms of nonlinear characteristics of a spatial light modulator (SLM) at the Fourier plane. The correct phase information of the correlation signal is recovered from the first-order harmonic of the nonlinearly transformed interference intensity, and various types of autocorrelation signals can be produced simply by varying the severity of the nonlinearity and without the need to synthesize specific matched filters. For example, the autocorrelation signal produced by a phase-only matched filter can be obtained by selecting the appropriate nonlinearity.

17 Claims, 1 Drawing Sheet

NONLINEAR JOINT TRANSFORM OPTICAL CORRELATOR HAVING VARYING DEGREES OF NONLINEARITY

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of optical correlators.

Real time pattern recognition is one of the most important applications of optical data processing. Since optical correlator architectures can recognize the appearance of an object in the presence of noise, many real time optical pattern recognition systems have been proposed in recent years For some applications, the light efficiency of the classical correlators is not sufficient. This problem can be avoided by using phase-only matched filters in optical correlator systems.

Recently, we introduced a binary nonlinear image correlator with substantially superior performance compared with that of the classical optical correlator. See B. Javidi and J. L. Horner, "Single Spatial Light Modulator Joint Transform Correlator," Appl. Opt. 28, 1027–1032 (1989). This optical processor is a joint Fourier transform correlator based system which allows both the input scene and the reference objects to be updated in real time. The binary nonlinear image correlator uses binarization at the Fourier plane to threshold the Fourier transform interference intensity. The performance of the nonlinear optical correlator has been compared with that of the classical optical correlator in the areas of light efficiency, correlation peak to sidelobe ratio, autocorrelation width, and cross-correlation sensitivity. It was shown that compared with the classical correlator, the binary nonlinear joint transform correlator provides significantly higher peak intensity, larger peak to sidelobe ratio, narrower autocorrelation width, and better cross-correlation sensitivity. Since the autocorrelation functions have small width, larger reference images can be used, and the restriction on the locations of the images and their autocorrelation width, which exists for the classical joint transform correlator, is eliminated.

SUMMARY OF THE INVENTION

In accordance with the present invention, a joint Fourier transform image correlator uses varying degrees of nonlinearity at the Fourier plane to modify the Fourier transform interference intensity. We have shown that the nonlinearly transformed Fourier transform interference intensity can be considered as a sum of infinite harmonic terms. Each harmonic term is phase modulated by m times the phase modulation of the non-modified interference intensity, where m is an integer. The first-order harmonic term retains the correct phase information of the correlation signal and the correct phase information can be recovered from the first-order harmonic term. The higher-order correlation signals can be masked out at the output correlation plane. By varying the severity of the nonlinearity, various types of autocorrelation signals, such as the autocorrelation signal produced by a phase-only matched filter, can be obtained, without the need to synthesize the specific matched filter.

BRIEF DESCRIPTIONS OF THE DRAWINGS

Other objects, features, and advantages of the present invention will become apparent upon study of the following description taken in conjunction with the drawings in which.

PREFERRED EMBODIMENTS OF THE INVENTION

Figure 1:
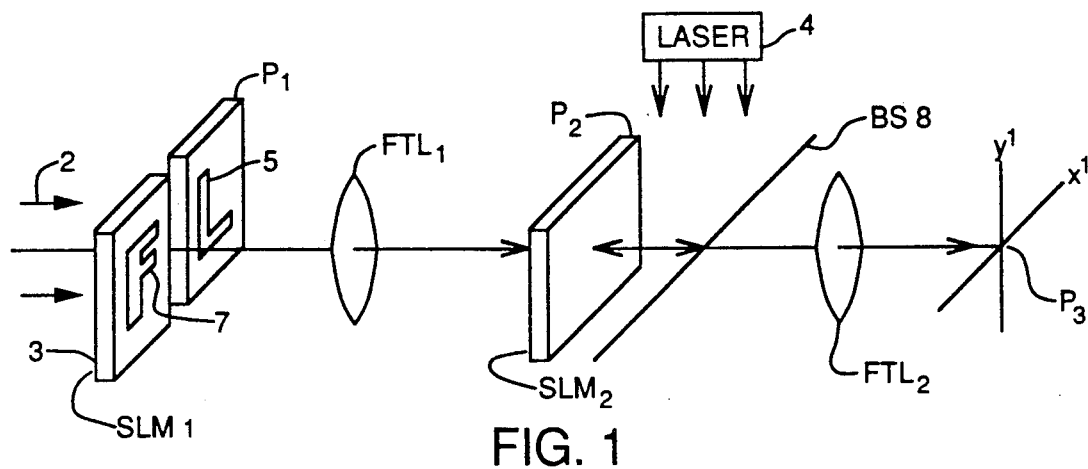
FIG. 1 illustrates a correlator employing a variable contrast optically addressed $SLM_2$ at the Fourier plane.
Figure 2:
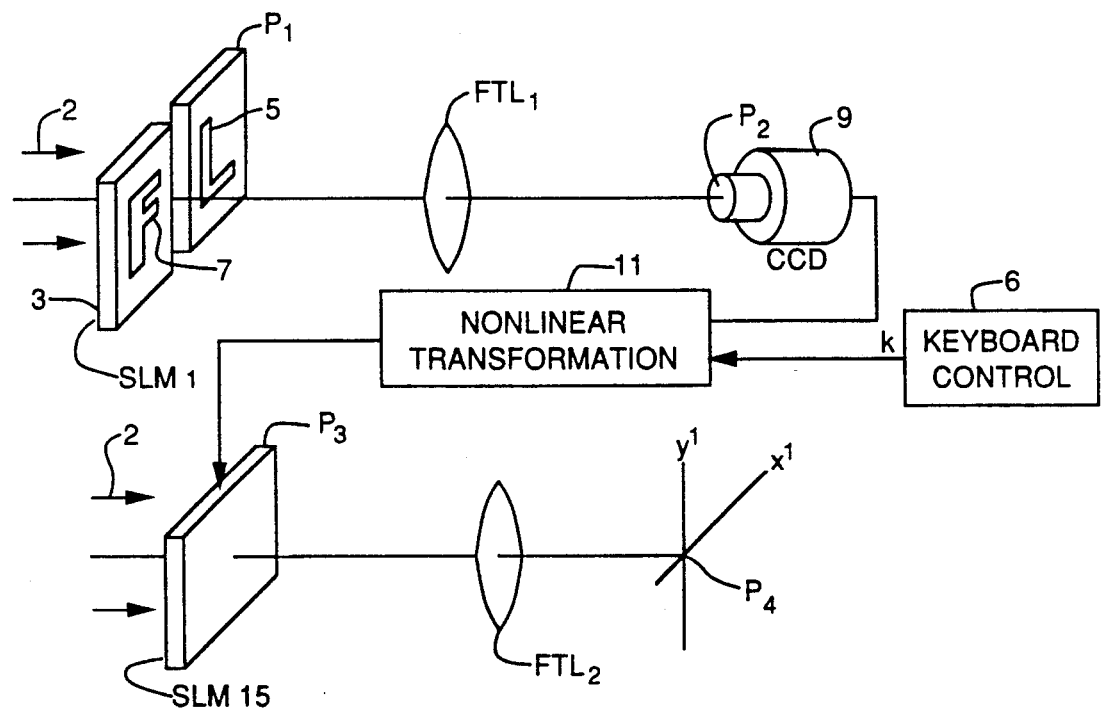
FIG. 2 illustrates an electrically addressed $SLM_{15}$ at the Fourier plane.

The implementation of the nonlinear correlator using an optically addressed SLM and an electrically addressed SLM is shown in FIGS. 1 and 2, respectively. Referring to FIG. 1 which illustrates the embodiment using the optically addressed SLM, plane $P_1$ contains the input signal displayed on input $SLM_1$. The incoherent images 5 and 7, enter the input $SLM_1$, and are converted to coherent images by laser light 2. The images are then Fourier transformed by lens $FTL_1$ and the interference between the Fourier transforms is produced at plane $P_2$. In FIG. 1, the nonlinear joint transform image correlator is implemented using a optically addressed $SLM_2$ at the Fourier plane that has a variable nonlinear characteristic. The Fourier transform interference pattern is displayed at the input of optically addressed $SLM_2$ with nonlinear characteristics to obtain the intensity of the Fourier transform interference pattern. The nonlinear optically addressed $SLM_2$ also nonlinearly transforms the joint power spectrum according to the nonlinear characteristics of the device. For a further discussion of nonlinear properties of SLM devices see pages 478–514 of the chapter entitled "Spatial Light Modulators: Applications and Functional Capabilities" in a book entitled "Optical Signal Processing" edited by Joseph L. L. Horner; Academic Press (1987). The nonlinearly transformed interference intensity is read out from the output of $SLM_2$ by coherent light directed at the SLM via a laser 4 and beam splitter 8 for example. The correlation signals can be produced by $FTL_2$ at the output plane $P_3$ by taking the inverse Fourier transform of the nonlinearly transformed interference intensity distribution provided at the output of $SLM_2$.

In FIG. 2, an electrically addressed $SLM_{15}$ is used to implement the nonlinear correlator. The intensity of the Fourier transform interference is obtained by a CCD array 9 located at plane $P_2$, and is nonlinearly transformed using a nonlinear network 11. Network 11 could include a nonlinear $K^{th}$ law means for raising each pixel value of the JPS to the $K^{th}$ power and could comprise, for example, operational amplifiers with suitable nonlinear feedback components. Desired values of K may be inputted into the network via keyboard 6. Laser light 2 is used to read out the nonlinearly transformed intensity of the Fourier transform data from $SLM_{15}$ located at plane $P_3$. This data was previously inputted by network 11 into the X-Y array of $SLM_{15}$. The correlation functions are produced at plane $P_4$ by providing lens $FTL_2$ for taking the inverse Fourier transform of the nonlinearly transformed interference intensity distribution at plane $P_3$. For further information regarding the nature of the CCD image sensor 9 and network 11, see U.S Pat. No. 4,832,447 issued to Javidi, incorporated by reference herein. The algorithm to follow, however, differs from the algorithm employed in the nonlinear transformation network of the patent.

In the CCD based embodiment of FIG. 2, the nonlinear network 11 could comprise a microprocessor for applying the $K^{th}$ law non-linearity, or other types of nonlinearities, to each pixel intensity produced by CCD 9, and for changing the value of K, to in turn change the severity of the nonlinearity. See the discussion to follow relating to equations (7) and (8).

The output of the nonlinear network 11 can be written as $$g(E) = \sum_{v=0}^{\alpha} H_v[R(\alpha,\beta),S(\alpha,\beta)]\cos[2vx_0\alpha + v\phi_S(\alpha,\beta) - v\phi_R(\alpha,\beta)], \quad (1)$$

where $$H_v[R(\alpha,\beta),S(\alpha,\beta)] = \frac{\epsilon_v}{2\pi} (j)^v \int G(\omega)\exp\{i\omega[R^2(\alpha,\beta) + S^2(\alpha,\beta)]\} \times J_v[2\omega R(\alpha,\beta)S(\alpha,\beta)]d\omega. \quad (2)$$

In this equation, $(\alpha, \beta)$ are the angular spatial frequency coordinates.

$S(\alpha, \beta) \exp[i\phi_S(\alpha, \beta)]$ and $R(\alpha, \beta) \exp[i\phi_R(\alpha, \beta)]$ correspond to the Fourier transforms of the input signals s(x,y) and r(x,y), respectively. Here, $R(\alpha, \beta)$ and $S(\alpha, \beta)$ are the amplitude spectrum and $\phi R(\alpha, \beta)$ and $S(\alpha, \beta)$ are the phases of the Fourier transforms.

It can be seen from Eq. (1) that for $v=1$, the nonlinear system has preserved the phase of the cross-correlation term $[\phi S(\alpha, \beta) - \phi\phi R(\alpha, \beta)]$ and only the amplitude is affected. This explains the good correlation properties of the first-order correlation signal at the output plane. The higher-order terms in the series expansion [Eq. (1)] can be removed by masking them out at the output plane, although the intensity of the higher-order terms is relatively small compared with that of the first-order correlation signal.

Figure 3:
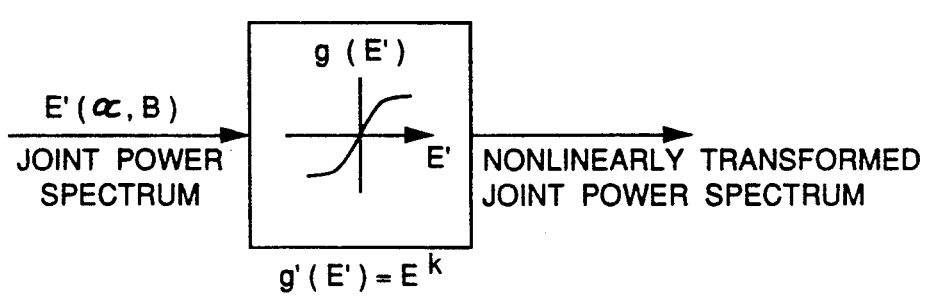
FIG. 3 illustrates schematically, a general nonlinear transformation used at the Fourier plane.

To investigate the effects of nonlinearity on the correlation signal, we examined two types of nonlinearity; the hard limiter and a general type $K^{th}$ law device. The transfer characteristics of the limiter are shown in FIG. 3. In the Fourier transform method of analysis, we consider the nonlinear effects of the interference intensity on the terms corresponding to the cross-correlation signals only. Thus, it is assumed that the unmodulated terms have been subtracted from the joint power spectrum.

The Fourier transform of the full wave (odd) $K^{th}$ law device is given by $$G(\omega) = \frac{2}{(i\omega)^{k+1}} \Gamma(k + 1), k \leq 1, \quad (3)$$

Where $\Gamma(\cdot)$ is the gamma function, and k is the severity of the nonlinearity; $k=1$ corresponds to a linear device and $k=0$ corresponds to a hard clipping nonlinearity, usually referred to as the binary joint transform correlator.

Substituting the Fourier transform of the nonlinearity in Eq. (2), we have $$H_v[R(\alpha,\beta),S(\alpha,\beta)] = \Gamma(k + 1) \frac{\epsilon_v}{\pi} (j)^{v-k-1} \times \quad (4)$$

$$\int \frac{1}{\omega^{k-1}} J_v[2\omega R(\alpha,\beta)S(\alpha,\beta)]d\omega.$$

Thus, $H_v[R(\alpha,\beta),S(\alpha,\beta)]$ can be written as $$H_v[R(\alpha,\beta),S(\alpha,\beta)] = \quad (5)$$

$$2\frac{\Gamma(k - 1)\epsilon_v[2R(\alpha,\beta)S(\alpha,\beta)]^k}{2^{k+1}\Gamma\left(1 - \frac{v-k}{2}\right)\Gamma\left(1 + \frac{v+k}{2}\right)}$$

The output of the nonlinearity using Eq. (5) is given by $$g_\lambda(E) = \sum_{\substack{v=1 \\ (v \text{ odd})}}^{\alpha} \frac{\epsilon_v\Gamma(k + 1)[R(\alpha,\beta)S(\alpha,\beta)]^k}{2^k\Gamma\left(1 - \frac{v-k}{2}\right)\Gamma\left(1 + \frac{v+k}{2}\right)} \times \quad (6)$$

$$\cos[2vx_0\alpha + v\phi_S(\alpha,\beta) - v\phi_R(\alpha,\beta)].$$

It can be seen from this equation that each harmonic term is phase modulated by v times the phase difference of the input signal and the reference signal Fourier transforms, and the higher-order correlation signals are diffracted to $2vx_O$. The envelope of each harmonic term is proportional to the $k^{th}$ power of the product of the Fourier transform magnitudes of the input and reference signals. If the phase of the input and reference signals is the same, the thresholded output will produce an output correlation signal corresponding to the inverse Fourier transform of the $k^{th}$ power of the $2R(\alpha, \beta)S(\alpha, \beta)$. Furthermore, for $k=1$ the output will produce the liner correlation between the reference signal and the input signal.

The correct phase information of the joint power spectrum is obtained for the first-order harmonic term $(v=1)$ which yields $$g_{1k}(E) = \frac{2\Gamma(k + 1)[R(\alpha,\beta)S(\alpha,\beta)]^k}{\Gamma\left(1 - \frac{1-k}{2}\right)\Gamma\left(1 + \frac{1+k}{2}\right)} \times \quad (7)$$

$$\cos[2x_0\alpha + \phi_S(\alpha,\beta) - \phi_R(\alpha,\beta)].$$

If the input and reference signals are the same, Eq. (7) will produce the thresholded joint power spectrum for autocorrelation signals; i.e., $$g_{1k}(E) = \frac{2\Gamma(k + 1)}{\Gamma\left(1 - \frac{1-k}{2}\right)\Gamma\left(1 + \frac{1+k}{2}\right)} \times \quad (8)$$

$$[R(\alpha,\beta)]^{2k}\cos[2x_0\alpha].$$

It can be seen from Eq. 8 that for $k=\frac{1}{2}$, the nonlinearly transformed interference intensity will produce an autocorrelation signal that is identical to the autocorrelation signal obtained by a phase-only matched filter. Thus, a phase-only autocorrelation signal is produced without synthesizing a phase-only matched filter. Furthermore, various types of autocorrelation signals can be produced simply by varying the degree of nonlinearity and without the need to synthesize the specific matched filter.

It is noted from Eq. (7) and (8) that varying the severity of the nonlinearity k will produce correlation signals with different characteristics. For highly nonlinear transformations (small k), the high spatial frequencies are emphasized and the processor becomes better able to discriminate between similar targets, but becomes more sensitive to image distortions. Thus, during correlation of each side-by-side input and reference image, it is deemed desirable to continuously increase the degree of nonlinearity from say k=1 down to k=0. For most types of images, most of the energy is concentrated in the low spatial frequency content of the JPS. Thus the low spatial frequency pixel values are larger than the high spatial frequency pixel values. In the compression type of nonlinearity, where k<1, we enhance or emphasize high spatial frequency values that are small relative to low spatial frequency pixel values. However, nonlinearities where k=1 are within the scope of the present invention. Small degrees of nonlinearity (k close to unity) will produce similar results as that of the linear matched filter Other correlation performance can be obtained by changing the degree of nonlinearity. Selection of the appropriate nonlinearity may depend on the type of operation desired and/or the type of image to be processed.

The performance of the nonlinear correlator was compared with the linear correlator for different degrees of nonlinearity. The results for both types of correlators are listed in the Table. It was found that the nonlinear correlator for k=0.5 has a correlation peak intensity 559 times greater, an autocorrelation peak to sidelobe ratio 10 times higher, and a correlation width 40 times narrower than the linear correlator. It is evident from our computer correlation generated plots that nonlinearly transforming the Fourier transform interference intensity provides better defined correlation signals and lower sidelobes. The small correlation sidelobes and narrow. width are important features of the nonlinear correlator when multiple object detection is intended.

| | CORRELATION RESULTS | | | |
|---|---|---|---|---|
| Correlator | k | $R^2$ | $R^2/SL^2$ | FWHM (x'-y') |
| Linear | 1 | 1 | 1.25 | (35-41) |
| Nonlinear | 0.9 | 1.86 | 1.53 | (23-23) |
| Nonlinear | 0.8 | 4.48 | 2.2 | (5-7) |
| Nonlinear | 0.7 | 15.3 | 4.14 | (3-3) |
| Nonlinear | 0.6 | 77.5 | 9.5 | (1-1) |
| Nonlinear | 0.5 | 559. | 12.7 | (1-1) |

$R^2$ is the first-order autocorrelation peak intensity, $SL^2$ is the largest sidelobe intensity, and k is the degree of nonlinearity given by Eq. (2). FWHM is the full correlation width at half-maximum response.

Improvement in the correlation peak value is due to the increase in the intensity of the nonlinear transformed Fourier transform interference at the Fourier plane. In the example provided here, binarization of the interference intensity resulted in 3300 times more intensity in the Fourier plane than in the linear case. The intensity of the joint power spectrum for the hard clipping case is equal to the space-bandwidth product of the binary SLM used at the Fourier plane. Our computer simulations used arrays of 128×128 pixels for demonstration. For further details and test data, see a paper by B. Javidi, describing various features of the present invention in APPLIED OPTICS/Vol. 28, No. 12 Jun. 15, 1989.

While preferred embodiments of the present invention have been described, numerous variations will be apparent to the skilled worker in the art, and thus the scope of the invention is to be restricted only by the terms of the following claims and art recognized equivalents thereof.

What is claimed is:

1. A nonlinear joint Fourier transform image correlator comprising:
    (a) a joint image production means for producing a joint image of a reference image and an input image;
    (b) a first Fourier transform means for receiving said joint image and for producing a joint power spectrum between Fourier transforms of the reference image and the input image;
    (c) nonlinear joint power spectrum transform means for transforming said joint power spectrum in accordance with a variable degree of nonlinearity;
    (d) second Fourier transform means for producing the inverse Fourier transform of the output of the nonlinear joint power spectrum transform means; and
    (e) control means for altering the degree of nonlinearity of said joint power spectrum transform means for producing various types of correlation signals without the need to synthesize various image correlation filters.

2. The correlator of claim 1 wherein said nonlinear joint power spectrum transform means includes means for nonlinearity enhancing small values of joint power spectrum pixels and for limiting large values of joint power spectrum pixels.

3. The correlator of claim 2 wherein said nonlinear joint power spectrum transform means includes means for continuously increasing said degree of nonlinearity during correlation of each input and reference image.

4. The correlator of claim 1 wherein said nonlinear joint power spectrum transform means includes means for continuously increasing said degree of nonlinearity during correlation of each input and reference image.

5. The correlator of claim 1, 2, 4, or 3 wherein said nonlinear joint power spectrum transform means comprises a gray scale spatial light modulator.

6. The correlation of claim 5 wherein said first and second Fourier transform means comprise optical lenses.

7. The correlator of claim 1, 2, 4, or 3 wherein said nonlinear joint power spectrum transform means includes an image sensor for electronically producing said joint power spectrum for further electronic nonlinear transformation.

8. The correlator of claim 7 wherein said first and second Fourier transform means comprise optical lenses.

9. The correlator of claims 1, 2, 4, or 3 wherein said first and second Fourier transform means comprise optical lenses.

10. An image correlation method employing a joint Fourier transform correlator comprising the steps of:
    (a) providing a joint image of a reference image and an input image;
    (b) producing a joint power spectrum between Fourier transforms of the reference image and the input image;

(c) transforming said joint power spectrum in accordance with a plurality of differing degrees of nonlinearity for producing various types of correlation signals without the need to synthesize various image correlation filters; and (d) inverse Fourier transforming signals produced in accordance with step (c) for producing said various types of correlation signals.

11. The method of claim 10 wherein step (c) includes continuously increasing said degree of nonlinearity during correlation of each input and reference image.

12. The method of claim 11 wherein step (c) includes nonlinearly enhancing small values of joint power spectrum pixels and limiting large values of joint power spectrum pixels.

13. The method of claim 10 wherein step (c) includes nonlinearly enhancing small values of joint power spectrum pixels and limiting large values of joint power spectrum pixels.

14. An image correlation method employing a joint Fourier transform correlator comprising the steps of:
   (a) producing a joint image of a particular reference image and a particular input image during a particular correlation interval;
   (b) producing a joint power spectrum between Fourier transforms of the reference image and the input image during said particular correlation interval;
   (c) transforming said joint power spectrum a plurality of times in accordance with a plurality of differing degrees of nonlinearity during said particular interval for producing a plurality of various types of correlation signals without the need to synthesize various image correlation filters; and
   (d) inverse Fourier transforming signals produced in accordance with step (c) for producing said various types of correlation signals.

15. The method of claim 14 wherein step (c) includes continuously increasing said degree of nonlinearity during correlation of each input and reference image during said particular interval.

16. The method of claim 14 wherein step (c) includes nonlinearly enhancing small values of joint power spectrum pixels and limiting large values of joint power spectrum pixels.

17. The method of claim 15 wherein step (c) includes nonlinearly enhancing small values of joint power spectrum pixels and limiting large values of joint power spectrum pixels.

* * * * *